G. PALMER.
Combined Ditcher and Scraper.
No. 9,344. Reissued Aug. 17, 1880.
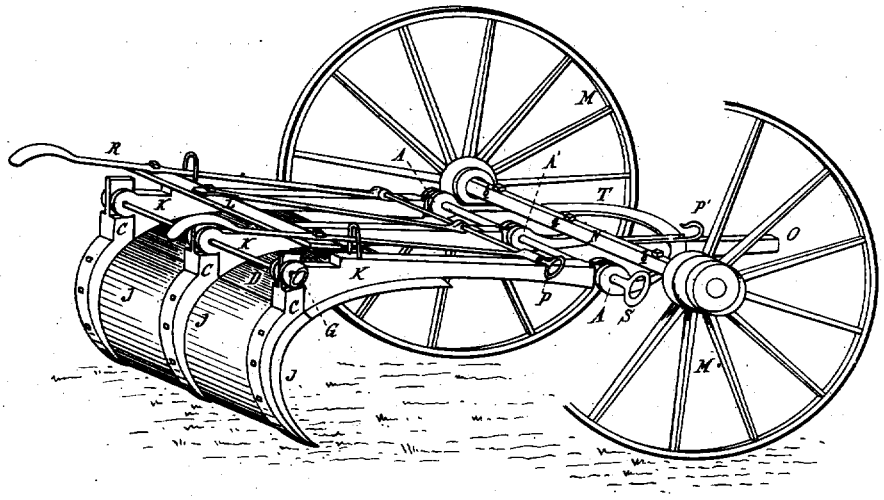
Attest:
A. Barthel
Theo. S. Day
Inventor:
G. Palmer
By Atty
Thos. S. Sprague
N. PETERS, PHOTO-LITHOGRAPHER, WASHINGTON, D. C.

UNITED STATES PATENT OFFICE.

GEORGE PALMER, OF BRIDGEVILLE, MICHIGAN.

COMBINED DITCHER AND SCRAPER.

SPECIFICATION forming part of Reissued Letters Patent No. 9,344, dated August 17, 1880.

Original No. 225,637, dated March 16, 1880. Application for reissue filed June 25, 1880.

*To all whom it may concern:*

Be it known that I, GEORGE PALMER, of Bridgeville, Gratiot county, and State of Michigan, have invented a Combined Ditcher and Scraper, of which the following is a full, true, and exact description.

The nature of my invention relates to certain new and useful improvements in that class of machines used for scraping earth and excavating ditches; and the invention consists in the peculiar construction of a truck provided with devices for quickly and easily removing the different kinds of implements required for scraping and ditching, and adapted to pivotally connect such implement directly to the draft, thereby avoiding any strain upon the truck except such as is necessary to give direction to the wheels and support the draft appliances; also, in the general construction, combination, and arrangement of parts, as more fully hereinafter described.

In excavating ditches, especially in new and timber-growing sections of the country, it is necessary to mark out the line of the ditch and cut the sod by means of a sod and root cutter, after which the sod and roots must be removed by some device for the purpose in order to allow the scraper, which completes the work, to successfully perform its function. Hence the object of my invention is, primarily, to construct a light truck so arranged that the necessary implements to successively perform the operations hereinbefore described may be quickly and easily detached or replaced, and so arranged that the draft is directly upon the implement attached to such truck; and, secondarily, to provide an easily-adjusted scraper to such truck.

In the accompanying drawing, wherein my improved device is shown in perspective, M represents the wheels, and N the axle, of my truck.

O represents the tongue provided with draft-hook P′, which extends rearward and terminates in a double eye, A′. This iron is secured to the center of the axle by the bolt *a*, and also to the front center of the semicircular yoke T. This yoke is secured to the axle by the bolts *b*, and its rear ends terminate in eyes A, care being taken that the eyes A and A′ are in line to allow of the easy removal and replacement of the rod S. The eyes A and A′ are so constructed and the tenons on the arms are so fitted therein as to allow the scraper to readily rise and fall vertically, but prevent any lateral movement.

K are three iron bars forming the upper portion of the frame of the scraper, attached to the draft upon the axle by the rod S passing through the eyes A.

D is the upper plate of the scraper, constructed of iron or steel plate, fastened to the frame K by means of bolts or rivets.

C are three iron bars forming the frame of the blade of the scraper, to which the steel plate J is attached by means of rivets. The three iron bars C are provided with tenons at their upper ends, which are pivoted in the slotted tips of the bars K by a rod, G, passing transversely through said tenons and tips, and the tenons project at the top, which, with the slot in the upper side of the iron bars K, form a recess to receive the bar L, which forms the lock and is adjusted by means of the handles R, which, being pressed down, hold the scraper in position for loading, and being raised, unload the scraper.

What I claim as my invention is—

1. A two-wheel truck wherein the draft-pole is secured directly to the draft-iron P′, the latter of which is secured to the center of the axle and terminates in the eye A′, and in combination with the yoke T, secured to the axle and the draft-iron, as described, said yoke terminating in eyes A, substantially as described.

2. The combination of the pivoted bars K, provided with the plate D, and pivoted bars C, provided with the steel plate J, all constructed and arranged to operate substantially in the manner herein shown and described.

3. The combination of the pivoted and slotted bars K, pivoted and projecting iron bars C, to which the scraper-plate J is attached, locking-bar L, and handles R, the several parts constructed and relatively arranged to operate substantially in the manner herein shown and described.

4. The combination of a scraper or ditcher with a truck, the frame of the scraper being pivoted between eyes on the truck, having their pivot-holes in line with each other horizontally to allow the scraper to move vertically and yet prevent its having any lateral movement, substantially as described.

Witnesses: GEORGE PALMER.

H. S. SPRAGUE,

THEO. S. DAY.